US007914172B2

(12) United States Patent
Nagara et al.

(10) Patent No.: US 7,914,172 B2

(45) Date of Patent: Mar. 29, 2011

(54) LIGHT CONTROL SYSTEM

(75) Inventors: Wes A. Nagara, Commerce Township, MI (US); Robert Bruno Bucciarelli, Plymouth, MI (US); Theodore Charles Wingrove, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 244 days.

(21) Appl. No.: 12/253,302

(22) Filed: Oct. 17, 2008

(65) Prior Publication Data

US 2010/0097817 A1 Apr. 22, 2010

(51) Int. Cl.

| | |
|---|---|
| ***F21V 9/00*** | (2006.01) |
| ***B60Q 1/00*** | (2006.01) |
| ***H05B 37/02*** | (2006.01) |

(52) U.S. Cl. ......................... 362/231; 362/464; 315/312

(58) Field of Classification Search .................. 362/464, 362/253, 234, 231, 800, 249.05, 249.12; 315/312, 362

See application file for complete search history.

(56) References Cited

U.S. PATENT DOCUMENTS

| | | | | |
|---|---|---|---|---|
| 4,779,168 | A | 10/1988 | Montgomery | |
| 6,608,453 | B2 * | 8/2003 | Morgan et al. | 315/312 |
| 6,655,817 | B2 | 12/2003 | Devlin et al. | |
| 7,202,613 | B2 * | 4/2007 | Morgan et al. | 315/312 |
| 7,344,279 | B2 | 3/2008 | Mueller et al. | |
| 7,347,597 | B2 | 3/2008 | French | |
| 7,360,934 | B2 | 4/2008 | Sakurada | |
| 2003/0057886 | A1 * | 3/2003 | Lys et al. | 315/291 |
| 2003/0137258 | A1 * | 7/2003 | Piepgras et al. | 315/291 |
| 2005/0047134 | A1 * | 3/2005 | Mueller et al. | 362/231 |
| 2005/0111231 | A1 | 5/2005 | Crodian et al. | |
| 2005/0128751 | A1 | 6/2005 | Roberge et al. | |
| 2007/0291483 | A1 | 12/2007 | Lys | |
| 2009/0034249 | A1 * | 2/2009 | Garbus, Jr. | 362/231 |

* cited by examiner

*Primary Examiner* — Bao Q Truong

(74) *Attorney, Agent, or Firm* — Fraser Clemens Martin & Miller LLC; J. Douglas Miller

(57) ABSTRACT

A unified lighting system including a plurality of light emitting devices, wherein each light emitting device generates a color output in response to a plurality of light settings and a modification to the light settings of one light emitting device is automatically propagated to the other light emitting devices, thereby providing a substantially uniform color output of the lighting system.

17 Claims, 1 Drawing Sheet

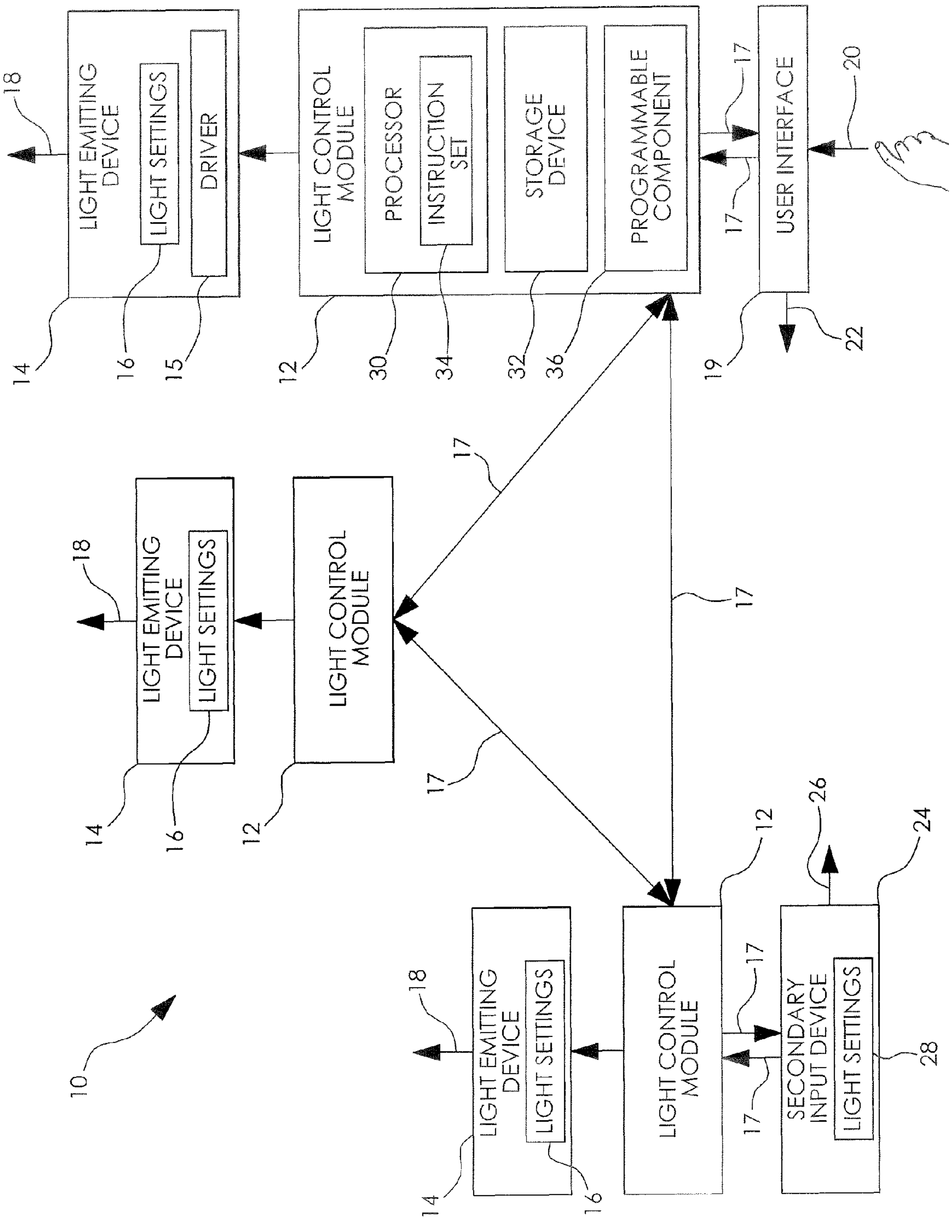
LIGHT EMITTING DEVICE
LIGHT SETTINGS
DRIVER
LIGHT CONTROL MODULE
PROCESSOR
INSTRUCTION SET
STORAGE DEVICE
PROGRAMMABLE COMPONENT
USER INTERFACE
LIGHT EMITTING DEVICE
LIGHT SETTINGS
LIGHT CONTROL MODULE
LIGHT EMITTING DEVICE
LIGHT SETTINGS
LIGHT CONTROL MODULE
SECONDARY INPUT DEVICE
LIGHT SETTINGS
10
12
14
15
16
17
18
19
20
22
24
26
28
30
32
34
36

LIGHT CONTROL SYSTEM

FIELD OF THE INVENTION

The present invention relates to vehicle lighting. More particularly, the invention is directed to a light control system for synchronizing multiple light outputs in a vehicle.

BACKGROUND OF THE INVENTION

Lighting systems are currently being integrated with vehicle systems and components to provide a unique lighting appearance to the driver and passengers of the vehicle. Further, accent lighting can be installed on the exterior of the vehicle for personalized ascetics. With each lighting system having a separate source of light and associated light settings (on/off/intensity/color/etc. . . . ), there exists a need for a light control system and methods to control each of the lighting systems in the vehicle.

U.S. published application 20050111231, to Crodian et al., shows a customizable lighting system including control of brightness and timing parameters of a plurality of lights. However, the methods and system described in Crodian et al. rely on clock cycles and duty cycles to control the brightness of the lights in a sequential light pattern.

Currently, there are no methods to propagate light settings of a light emitting device to other light emitting devices in a single step for efficiency and an optimized Human Machine Interface (HMI). Depending on the architecture, illumination in the interior of a vehicle is accomplished through various methods. Some OEMs have a separate lighting control circuit contained within each device and others execute light control through the vehicle network.

It would be desirable to have a unified lighting system including a plurality of light emitting devices, wherein each light emitting device generates a color output in response to a plurality of light settings and a modification to the light settings of one light emitting device is automatically propagated to the other light emitting devices, thereby providing a substantially uniform color output of the lighting system.

SUMMARY OF THE INVENTION

Concordant and consistent with the present invention, a unified lighting system including a plurality of light emitting devices, wherein each light emitting device generates a color output in response to a plurality of light settings and a modification to the light settings of one light emitting device is automatically propagated to the other light emitting devices, thereby providing a substantially uniform color output of the lighting system, has surprisingly been discovered.

In one embodiment, a unified lighting system comprises: a plurality of light emitting devices, wherein each of the light emitting devices generates a color output in response to a plurality of light settings; and a plurality of light control modules in communication with each other, wherein each of the light control modules is adapted to receive a control signal, adjust the light settings of at least one of the light emitting devices in response to the control signal, and propagate the control signal to others of the light control modules.

In another embodiment, a unified lighting system for a vehicle comprises: a plurality of light emitting devices adapted to emit a color output in response to a plurality of light settings; a plurality of light control modules in communication with each other, wherein each of the light control modules is adapted to receive a control signal, adjust the light setting of at least one of the light emitting devices in response to the control signal, and propagate the control signal to others of the light control modules; and a secondary input device adapted to interconnect with at least one of the light control modules for transmitting and receiving the control signal.

In a further embodiment, a unified lighting system for a vehicle comprises: a plurality of light emitting devices adapted to emit a color output in response to a plurality of light settings, wherein the light settings represent the mixing of emitted color light to generate the color output having a particular color appearance; a plurality of light control modules in communication with each other, wherein at least one of the light control modules receives a control signal, adjusts the light settings of an associated one of the light emitting devices in response to the control signal, and propagates the control signal to others of the light control modules for adjusting the light settings of others of the light emitting devices; a secondary input device adapted to interconnect with at least one of the light control modules for transmitting and receiving the control signal; and a user interface adapted to transmit the control signal to at least one of the light control modules.

BRIEF DESCRIPTION OF THE DRAWINGS

The above, as well as other advantages of the present invention, will become readily apparent to those skilled in the art from the following detailed description of the preferred embodiment when considered in the light of the accompanying drawing which is a schematic block diagram of a unified lighting system according to an embodiment of the present invention.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Referring to the FIGURE, there is illustrated a unified lighting system 10 according to an embodiment of the present invention. The unified lighting system 10 includes a plurality of light control modules 12, wherein each of the light control modules 12 is in communication with a light emitting device 14. As shown, the unified lighting system 10 includes three light control modules 12, each of the light control modules 12 in direct communication with a single light emitting device 14. It is understood that any number of light control modules 12 may be included in the unified lighting system 10, as desired. It is further understood that each light control module 12 may be in communication with any number of light emitting devices 14, as desired. As a non-limiting example, the light control modules 12 may be integrated with any system, device, or component adapted to emit a color light.

In certain embodiments, a driver 15 is in electrical communication with at least one of the light emitting devices 14 and the light control module 12, wherein the driver 15 controls the flow of an electric current to the at least one of the light emitting devices 14 in response to a plurality of light settings 16. In other embodiments, the light control modules 12 control the light emitting devices 14 directly.

Each of the light control modules 12 is adapted to receive a control signal 17, adjust the light settings 16 of the associated light emitting devices 14 in response to the control signal 17, and propagate the control signal 17 to other light control modules 12. It is understood that the light settings 16 of each of the light emitting devices 14 represent a color output 18 of the associated light emitting device 14. Specifically, the light settings 16 control the mixing of emitted colors to generate the color output 18 having a particular color. However, the light settings 16 may control other characteristics of the color output 18 such as light intensity and an "on/off" setting, for example. As a non-limiting example, the light settings 16 may represent at least one of a magnitude of electric current transmitted to the associated light emitting device 14 and a magnitude of the voltage applied to the associated light emitting device 14. In certain embodiments, the light settings 16 represent an intensity ratio of red light to green light to blue light in order to create the appearance of a variety of colors. It is understood that other color mixing may be used such as ratios of cyan, magenta and yellow, for example. Any of the light control modules 12 has the ability to initiate the propagation of the updated light settings 16 through the control signal 17. It is understood that the updating of the light settings 16 of each of the light emitting devices 14 may be timed or untimed and changes to the color output may be linear or non-linear.

Each of the light control modules 12 is adapted to receive the control signal 17 by any communication means such as wireless communication, blue tooth, universal serial bus (USB), and Ethernet, for example. Other forms of communication may be used, as desired. As shown, the light control modules 12 are in communication with other light control modules 12 in the unified lighting system 10. As a non-limiting example, the light control modules 12 may interconnect through wireless communication, blue tooth, Ethernet, or any other appropriate form of signal communication. As a further example, the light control modules 12 may interconnect through a vehicle network using a protocol such a Controller-area Network (CAN) or Media Oriented System Transport (MOST), for example. Other networks and protocols may be used, as desired.

In certain embodiments, each of the light control modules 12 is pre-programmed to communicate with other light control modules 12 in a pre-determined light-zone. The light-zone is defined as a number of the light control modules 12 that are each adapted to send and receive (i.e. propagate) the control signal 17 between each other in order to substantially unify the color output 18 of each of the associated light emitting devices 14 in the same light zone. It is understood that any number of light control modules 12 may be pre-programmed to intercommunicate with any other light control module 12 to form the light zones. It is further understood that a user has the ability to include or exclude any particular light control module 12 and light emitting device 14, as desired.

In certain embodiments, at least one of the light control modules 12 is adapted to intercommunicate with a user interface 19 for transmitting and receiving the control signal 17. Specifically, the user interface 19 receives a user-provided input 20 and transmits the control signal 17 to at least one of the light control modules 12 in response to the user-provided input 20. It is understood that the user-provided input 20 may be used to define the light settings 16, and thereby the color output 18, of at least one of the light emitting devices 14. The user interface 19 is also adapted to generate an interface color output 22 in response to at least one of the user-provided input 20 and the control signal 17 received from at least one of the light control modules 12. As a non-limiting example, the user interface 19 may be a touch screen device adapted to receive the user-provided input 20, emit the interface color output 22 in response to the user-provided input 20, and transmit the control signal 17. Other user interface devices and system may be used, as desired.

In the embodiment shown, at least one of the light control modules 12 is adapted to intercommunicate with a secondary input device 24. The secondary input device 24 may be any device adapted to intercommunicate with at least one of the light control modules 12 for transmitting and receiving the control signal 17. As shown, the secondary input device 24 is adapted to produce a secondary input device color output 26 based upon the light settings 28 of the secondary input device 24. It is understood that the light settings 28 of the secondary input device 24 may be pre-programmed, as desired. It is further understood that the light settings 28 of the secondary input device 24 may be modified in response to the control signal 17 received from at least one of the light control modules 12. In certain embodiments, the secondary input device 24 generates and transmits the control signal 17 to at least one of the light control modules 12. As a non-limiting example, the control signal 17 generated and transmitted by the secondary input device 24 represents the light setting 28 of the secondary input device 24. Accordingly, any of the light control modules 12 receiving the control signal 17 transmitted by the secondary input device 24, modifies the light settings 16 of the associated light emitting devices 14 to have substantially the same color output 18 as the secondary input device color output 26. It is understood that each of the light control modules 12 may be adapted to receive the control signal 17 from any secondary input device 24 and/or user interface 19. Other interfaces and devices may be used, as desired.

In one embodiment, at least one of the light control modules 12 includes a processor 30 and a storage device 32. The processor 30 is adapted to analyze the control signal 17 based upon an instruction set 34. The instruction set 34, which may be embodied within any computer readable medium, includes processor executable instructions for configuring the processor 30 to perform a variety of tasks. It is understood that the processor 30 may execute a variety functions such as controlling the modification and updating of the light settings 16 of the associated light emitting devices 14, for example. The storage device 32 may be a single storage device or may be multiple storage devices. Portions of the storage device 32 may also be located on the processor 30. Furthermore, the storage device 32 may be a solid state storage system, a magnetic storage system, an optical storage system or any other suitable storage system or device. It is understood that the storage device 32 is adapted to store the instruction set 34. Other data and information may be stored in the storage device 32 such as pre-programmed light settings, user-defined light settings, and recently used light settings, for example.

The at least one light control module 12 may further include a programmable component 36. The programmable component 36 is in communication with the processor 30. It is understood that the programmable component 36 may be in communication with any other component of the unified lighting system 10 such as the user interface 19 and the storage device 32, for example. In certain embodiments, the programmable component 36 is adapted to manage and control processing functions of the processor 30. Specifically, the programmable component 36 is adapted to control the analysis of the control signal 17 and the modification of the light settings 16 of at least one of the light control modules 12. The programmable component 36 provides a means for a user to actively manage the operation of the processor 30 and thereby control the resultant color output 18 of at least one of the light emitting devices 14. It is understood that the programmable component 36 may be adapted to manage and control the user interface 19. It is further understood that the programmable component 36 may be adapted to store data and information in the storage device 32 and retrieve data and information from the storage device 32.

The light emitting devices 14 may be any device, component, or system capable of producing the color output 18 in response to the associated light settings 16 such as light emitting diodes and liquid crystal displays, for example. Other devices, components, and systems may be used, as desired. As a non-limiting example, at least one of the light emitting devices 14 may be an ambient lighting system for a vehicle adapted to generate varying levels of color light intensity to produce a range of visible colors. As another example, at least one of the light emitting devices 14 may be a backlit instrument panel adapted to emit a color display to a driver of the vehicle. It is understood that each of the light emitting devices 14 may have additional controls and features that are independent of the unified lighting system 10.

In use, each of the light emitting devices 14 of the unified lighting system 10 generates the color output 18 in response to the associated light settings 16. A modification to the light settings 16 of one light emitting device 14 is automatically propagated to the other light emitting devices 14, thereby providing a substantially uniform color output 18 from each of the light emitting devices 14.

In certain embodiments, the light settings 16 of at least one of the light emitting device 14 are modified by at least one of the light control modules 12 in response to the control signal 17. Where the control signal 17 is received from the user interface 19, the control signal 17 represents the light settings 16 and the resultant color output 18 as defined by a user-provided input 20. For example, the user may directly program the color output 18 of at least one of the light emitting devices 14. Specifically, at least one of the light control modules 12 receives the control signal 17 from the user interface 19, updates the light settings 16 of the associated light emitting devices 14 in response to the control signal 17, and propagates the control signal 17 representing the updated light settings 16 to each of the light control modules 12 in the same light zone. Likewise, each of the light control modules 12 in the same light zone receives the control signal 17 and modifies the light settings 16 of the associated light emitting devices 14 in response to the control signal 17. Accordingly, each of the light emitting devices 14 in the particular light zone emits substantially the same color output 18 in response to the updated light settings 16. As a non-limiting example, the user may adjust the light settings 16 of at least one of the light emitting devices 14 such that the at least one of the light emitting devices 14 generates the color output 18 having the appearance of the color "green". As such, the user-defined light settings 16 are automatically propagated to all of the light control modules 12 in the same light zone through the control signal 17, wherein each of the light emitting devices 14 in the same zone is adjusted in response to the light settings 16 to produce the color output 18 having substantially the same "green" appearance.

Where the control signal 17 is received from the secondary input device 24, the control signal 17 represents data and information defining the light settings 28 of the secondary input device 24. For example, the user may have a handheld electronic device including personalized light settings 28 representing a secondary input device color output 26 having the color cyan. Once the secondary input device 24 establishes communication with at least one of the light control modules 12, the light settings 28 of the secondary input device 24 are automatically propagated to the at least one of the light control modules 12 in the form of the control signal 17. Once the at least one of the light control modules 12 receives the control signal 17, the at least one of the light control modules 12 updates the light settings 16 of the associated light emitting devices 14 and propagates the control signal 17, representing the light settings 16, to each of the light control modules 12 in the same light zone. Likewise, each of the light control modules 12 in the same light zone receives the control signal 17 and modifies the light settings 16 of the associated light emitting devices 14 in response to the control signal 17. Accordingly, each of the light emitting devices 14 in the particular light zone emits a substantially uniform color output 18, in this case, having the color appearance of cyan. It is understood that the secondary input device 24 may also be pre-programmed to receive the control signal 17 from at least one of the light control modules 12 and thereby adjust the color output 18 of the secondary input device 24 to substantially match the color output 18 of the associated light zone.

The unified lighting system 10 provides a unique control of the various light emitting devices 14 in a vehicle. A modification to the light settings 16 of any of the light emitting devices 14 is automatically propagated to the other light emitting devices 14 in the lighting system 10, thereby providing a substantially uniform color output 18 of each of the light emitting devices 14.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A unified lighting system comprising:

a plurality of light emitting devices, wherein each of the light emitting devices generates a color output in response to a plurality of light settings;

a plurality of light control modules in communication with each other, wherein each of the light control modules is adapted to receive a control signal, adjust the light settings of at least one of the light emitting devices in response to the control signal, and propagate the control signal to others of the light control modules and;

a user interface in signal communication with at least one of the light control modules to transmit the control signal to the at least one of the light control modules, wherein the user interface emits an interface color output, and wherein the light settings of the light emitting devices are adjusted so the color output of each of the light emitting devices substantially matches the interface color output.

2. The unified lighting system according to claim 1, wherein the light settings represent the mixing of emitted color light to generate the color output having a particular color appearance.

3. The unified lighting system according to claim 1, wherein each of the light control modules adjusts the light settings of the at least one of the light emitting devices to produce substantially the same color output generated by each of the light emitting devices.

4. The unified lighting system according to claim 1, wherein each of the light control modules includes a processor for analyzing the control signal.

5. The unified lighting system according to claim 1, wherein at least one of the light control modules includes a storage system for storing data and information.

6. The unified lighting system according to claim 1, wherein at least one of the light control modules includes a programmable component providing user-controlled management of the unified lighting system.

7. A unified lighting system for a vehicle comprising:

a plurality of light emitting devices integrated with the vehicle, wherein each of the light emitting devices emits a first color output based on an associated first light setting;

a plurality of light control modules, each of the light control modules in communication with each other and at least one of the light emitting devices, to control each of the first light settings of the first color output emitted by each of the light emitting devices; and a secondary input device emitting a second color output based on an associated second light setting, the secondary input device in signal communication with at least one of the light control modules for transmitting a control signal representing the second light setting to the at least one of the light control modules, wherein the at least one of the light control modules receives the control signal, adjusts the associated first light setting of the at least one of the light emitting devices in response to the control signal, and propagates the control signal to others of the light control modules to adjust the associated first light setting of each of the light emitting devices in response to the control signal, and wherein the first light setting of the first light output emitted by each of the light emitting devices is adjusted to substantially match the second light setting of the secondary input device.

8. The unified lighting system according to claim 7, wherein the first light settings represent the mixing of emitted color light to generate the color output having a particular color appearance.

9. The unified lighting system according to claim 7, wherein each of the light control modules adjusts the first light setting of the associated light emitting device to produce substantially the same first color output emitted from each of the light emitting devices.

10. The unified lighting system according to claim 7, wherein each of the light control modules includes a processor for analyzing the control signal.

11. The unified lighting system according to claim 7, wherein at least one of the light control modules includes a storage system for storing data and information.

12. The unified lighting system according to claim 7, wherein at least one of the light control modules includes a programmable component providing user-controlled management of the unified lighting system.

13. A unified lighting system for a vehicle comprising:

a plurality of light emitting devices adapted to emit a first color output in response to a plurality of first light settings, wherein the first light settings represent the mixing of emitted color light to generate the first color output having a particular color appearance;

a plurality of light control modules, each of the light control modules in communication with each other and at least one of the light emitting devices to control each of the first light settings of the first color output emitted by each of the light emitting devices;

a secondary input device emitting a second color output based on an associated second light setting, the secondary input device in signal communication with at least one of the light control modules; and a user interface emitting an interface color output, the user interface in signal communication with at least one of the light control modules, wherein at least one of the secondary input device and the user interface transmits a control signal to the at least one of the light control modules, the at least one of the light control modules adjusting the associated first light setting of the at least one of the light emitting devices in response to the control signal and propagating the control signal to others of the light control modules to adjust the associated first light setting of each of the light emitting devices in response to the control signal, and wherein the first color output of each of the light emitting devices is adjusted to substantially match at least one of the second color output and the interface color output.

14. The unified lighting system according to claim 13, wherein each of the light control modules adjusts the light settings of the associated light emitting devices to produce substantially the same color output emitted from each of the light emitting devices.

15. The unified lighting system according to claim 13, wherein each of the light control modules includes a processor for analyzing the control signal.

16. The unified lighting system according to claim 13, wherein at least one of the light control modules includes a storage system for storing data and information.

17. The unified lighting system according to claim 13, wherein at least one of the light control modules includes a programmable component providing user-controlled management of the unified lighting system.

* * * * *